US008132992B2

(12) United States Patent
van Walraven (10) Patent No.: US 8,132,992 B2
(45) Date of Patent: Mar. 13, 2012

(54) FASTENING ASSEMBLY (75) Inventor: Jan van Walraven, RK Mijdrecht (NL)

(73) Assignee: J. van Walraven Holding B.V., Mijdrecht (NL)

( * ) Notice: Subject to any disclaimer, the term of this patent is extended or adjusted under 35 U.S.C. 154(b) by 1022 days.

(21) Appl. No.: 11/995,678

(22) PCT Filed: Jul. 4, 2006

(86) PCT No.: PCT/NL2006/000332
§ 371 (c)(1),
(2), (4) Date: Jan. 14, 2008

(87) PCT Pub. No.: WO2007/008060
PCT Pub. Date: Jan. 18, 2007

(65) Prior Publication Data
US 2008/0193253 A1 Aug. 14, 2008

(30) Foreign Application Priority Data

Jul. 12, 2005 (NL) ...................................... 1029499

(51) Int. Cl.
*F16B 27/00* (2006.01)
(52) U.S. Cl. ............. 411/85; 411/84; 411/112; 411/970
(58) Field of Classification Search .................... 411/84, 411/85, 112, 970; 24/297, 458, 663; 403/21, 403/22
See application file for complete search history.

(56) References Cited

U.S. PATENT DOCUMENTS

| | | | | |
|---|---|---|---|---|
| 3,035,624 A * | 5/1962 | Jaworski | ...................... | 411/112 |
| 3,483,910 A * | 12/1969 | Van Huffel et al. | ............ | 411/112 |
| 4,146,074 A * | 3/1979 | Kowalski | ....................... | 411/111 |
| 4,210,367 A * | 7/1980 | Spisak | ........................ | 301/37.34 |
| 4,409,705 A * | 10/1983 | Yuunaga | .......................... | 24/415 |
| 4,562,622 A * | 1/1986 | Takabatake | ....................... | 24/427 |
| 4,575,295 A * | 3/1986 | Rebentisch | ...................... | 411/85 |
| 5,191,513 A * | 3/1993 | Sugiura et al. | ................ | 361/752 |
| 5,271,586 A * | 12/1993 | Schmidt | ........................... | 248/58 |
| 5,297,320 A * | 3/1994 | Keyaki et al. | .................... | 24/430 |
| 5,489,173 A * | 2/1996 | Hofle | ............................... | 411/85 |
| 5,655,865 A * | 8/1997 | Plank et al. | ...................... | 411/85 |
| 5,779,412 A * | 7/1998 | Nagai et al. | ..................... | 411/85 |

(Continued)

FOREIGN PATENT DOCUMENTS

CN 1085766 C 5/2002

(Continued)

*Primary Examiner* — Victor Batson
*Assistant Examiner* — Tyler Johnson
(74) *Attorney, Agent, or Firm* — Browdy and Neimark, PLLC (57) ABSTRACT A fastening assembly is provided for fixing an object to a profiled element with flanges which bound a longitudinal slot between them. The fastening assembly includes a metal washer element having a bearing face arranged for resting against the outside of the profiled element, and an elongated metal anchoring member situated on the underside of the bearing face of the washer element. The assembly furthermore includes a support connected to the washer element and supporting the anchoring member. The support includes a head with one or more connecting members engaging with the washer element, and legs, each extending from the head in a direction away from the washer element to a bottom end of the corresponding leg situated below the anchoring member. The support below the anchoring member includes one or more spring members supported upon the bottom ends of the legs and resiliently supporting and engaged with the anchoring member from underneath.

29 Claims, 6 Drawing Sheets

U.S. PATENT DOCUMENTS

| | | | |
|---|---|---|---|
| 6,042,296 A * | 3/2000 | Wittig et al. | 403/298 |
| 6,209,178 B1 * | 4/2001 | Wiese et al. | 24/458 |
| 6,290,426 B1 * | 9/2001 | van Gijsel et al. | 403/374.3 |
| 6,490,770 B1 * | 12/2002 | Matsuda et al. | 24/428 |
| 6,530,132 B2 * | 3/2003 | Yamagishi et al. | 24/427 |
| 6,575,681 B2 * | 6/2003 | Kojima et al. | 411/508 |
| 6,581,252 B1 * | 6/2003 | Sedlock et al. | 24/297 |
| 6,872,038 B2 * | 3/2005 | Westlake | 411/85 |
| 7,044,701 B2 * | 5/2006 | Herb | 411/84 |
| 7,059,024 B2 * | 6/2006 | Yoneoka et al. | 24/391 |
| 7,568,868 B2 * | 8/2009 | Motsch et al. | 411/112 |
| D607,775 S * | 1/2010 | Miyazaki et al. | D11/221 |
| 7,802,347 B2 * | 9/2010 | Tachi et al. | 24/427 |
| D627,258 S * | 11/2010 | Miyazaki et al. | D11/221 |
| 7,905,694 B2 * | 3/2011 | van Walraven | 411/85 |
| 2002/0050030 A1 * | 5/2002 | Takasawa | 24/415 |
| 2003/0185643 A1 * | 10/2003 | Thompson | 411/85 |
| 2004/0131442 A1 * | 7/2004 | Dieckmann | 411/112 |
| 2004/0154144 A1 * | 8/2004 | Yoneoka et al. | 24/391 |
| 2004/0165947 A1 * | 8/2004 | Herb | 403/374.3 |
| 2004/0165964 A1 * | 8/2004 | Herb | 411/84 |
| 2005/0271492 A1 * | 12/2005 | Jackson et al. | 411/112 |
| 2006/0207068 A1 * | 9/2006 | Lepper | 24/297 |
| 2007/0216139 A1 * | 9/2007 | Mazanek et al. | 280/728.2 |
| 2008/0034559 A1 * | 2/2008 | Tachi et al. | 24/427 |
| 2009/0260197 A1 * | 10/2009 | Keyaki et al. | 24/415 |

FOREIGN PATENT DOCUMENTS

| | | |
|---|---|---|
| DE | 19704902 C1 | 11/1998 |
| DE | 202004014441 U1 | 10/2005 |

* cited by examiner

FASTENING ASSEMBLY

BACKGROUND OF THE INVENTION

The invention relates to a fastening assembly for fixing an object to a profiled element with flanges which bound a longitudinal slot between them, in particular a profiled element of the C-section type.

In a common practical embodiment such a profile element is known as a C-rail or Strut rail.

Fastening assemblies for fixing an object to a profiled element with flanges which bound a longitudinal slot between them, in particular a profiled element of the C-section type, are generally known in the prior art. Typically said fastening assembly comprise a metal washer element, which has a bearing face that is arranged for resting against the outside of the profiled element and an elongated metal anchoring member, which is situated on the underside of the bearing face of the washer element and has axial and parts. Furthermore such a fastening assembly comprises a support for the anchoring member, which support is connected to the washer element, possibly detachably. Said support bears the anchoring member. In use the fastening assembly with its anchoring member can be aligned with the longitudinal slot and the anchoring member can be inserted through the longitudinal slot into the profiled element, and in such a way that subsequently after turning of the fastening assembly, the anchoring member—in a pre-assembly state—extends at an angle relative to the longitudinal slot, so that the flanges are situated in an accommodation spaces between the anchoring member and the washer and the anchoring member grips behind the flanges of the profiled element. The anchoring member and the washer element can subsequently be tensioned towards each other in order to fix the fastening assembly to the profiled element.

The invention aims to provide an improved fastening assembly.

A further aim is to provide a fastening assembly which can be efficiently mass-produced.

SUMMARY OF THE INVENTION

The invention provides a fastening assembly for fixing an object to a profiled element with flanges which bound a longitudinal slot between them, in particular a profiled element of the C-section type. Said fastening assembly comprises a metal washer element, which has a bearing face that is arranged for resting against the outside of the profiled element, and an elongated metal anchoring member, which is situated on the underside of the bearing face of the washer element and has axial end parts. Said fastening assembly furthermore comprises a support for the anchoring member, which support is connected to the washer element, possibly detachably, and which support bears the anchoring member. Said fastening assembly having between the washer element and each axial end part of the anchoring member an accommodation space which is accessible from the side of the fastening assembly, each accommodation space being for the accommodation of a flange of the profiled element, in such a way that the fastening assembly with its anchoring member can be aligned with the longitudinal slot and the anchoring member can be inserted through the longitudinal slot into the profiled element, and in such a way that subsequently after turning of the fastening assembly, the anchoring member—in a pre-assembly state—extends at an angle relative to the longitudinal slot, so that the flanges are situated in the accommodation spaces and the anchoring member grips behind the flanges of the profiled element. Said anchoring member and said washer element can subsequently be tensioned towards each other in order to fix the fastening assembly to the profiled element. Furthermore said support comprises a head with one or more connecting members, which connecting members, engage with the washer element, and furthermore comprises legs, each extending from the head in a direction away from the washer element to a bottom end of the corresponding leg situated below the anchoring member. Furthermore the support below the anchoring member comprises one or more spring members, which are supported upon the bottom ends of the legs and engage onto the anchoring member from underneath and resiliently support the anchoring member from underneath.

The resilient support of the anchoring member can be advantageous in various ways depending on the design of the remainder of the assembly. For instance, it may be that the resilient support contributes to the clamping effect in the pre-assembly state of the assembly. The resilient support can also make it easier to assemble the assembly. Furthermore, it is conceivable that the resilient support makes it possible to fit anchoring members of different thicknesses in a support, which can be an advantage as regards the production. It is also conceivable for the resilient support of the anchoring member to provide compensation for tolerances in the thickness and/or shape of the anchoring member.

The anchoring member can be in many different embodiments. In one simple embodiment, which is considered advantageous here, the anchoring member is a part made of a metal strip or plate with a central through-going threaded hole between the upper side and the underside, into which a bolt element can be screwed, or which bolt element may be screwed in during production of the assembly. Said bolt element then also projects through a corresponding hole in the washer element, as is generally known. In another, likewise generally known embodiment, the anchoring member is produced in one piece with a moulded-on stem, for example a cast part, which stem in that case is preferably threaded.

In an advantageous embodiment the support has a stop above the anchoring member, for example a stop body extending between the legs, along the top of the anchoring member, the one or more spring members holding the anchoring member pressed against said stop from underneath. This defines the position of the anchoring member. This solution makes it possible to accommodate anchoring members of different thicknesses in the support. Said different thicknesses may be chosen deliberately, for example depending on different envisaged load-bearing capacities of the assembly, but any tolerance in the thickness of the anchoring member can also be compensated for in this way. This flexibility or insensitivity to tolerances is very advantageous in the mass production of these types of assemblies.

In an advantageous embodiment the one or more spring members provide a spring travel of between 1 and 10 millimeters, possibly between 2 and 10 millimeters, and possibly between 3 and 8 millimeters, for the anchoring member.

The one or more connecting members advantageously retain the washer element movably relative to the anchoring member pressed against the stop, in such a way that the washer element can be tensioned in the direction towards the anchoring member, in order to fix the fastening assembly by clamping of the flanges. For example, the washer element can slide up and down relative to the one or more connecting members, which connecting members extend, for example, through apertures in the washer element and/or along the outer periphery of the washer element.

The head of the support furthermore comprises at least one clamping spring member, which is designed to provide a clamping effect between the assembly and the profiled element in the pre-assembly state, which clamping effect is such that the assembly can be slid manually along the profiled element. This clamping effect is preferably sufficient to ensure that in the case of a vertically extending profiled element the assembly is prevented from sliding downwards before the assembly is finally tightened and secured.

Further advantageous embodiments of the assembly according to the invention are described in the claims and in the description below with reference to the drawing.

The invention furthermore relates to a method for producing various embodiments of hastening assemblies of the type described here, in which a single uniform support is produced in each case for several embodiments of fastening assemblies, and in which anchoring members are produced in different embodiments, in which at least the thickness of the anchoring member, viewed in the direction at right angles to the washer element, is different, and in which the anchoring members in different embodiments are otherwise so similar that they can each be placed in the uniform support, and in which an anchoring member is placed in a support, and in which the resiliency of the one or more spring members of the support absorbs the various thicknesses of the anchoring members.

The invention furthermore relates to a method for producing a fastening assembly of the type described here, in which the support comprises a base part, which contains at least the head of the support, and also a spring part, which spring part contains at least the one or more spring members, which base part and spring part are produced as separate parts and fixed to each other.

In this method the base part and the spring part are preferably made of plastic, preferably simultaneously in a common injection mould, preferably with the formation of one or more removable connections, for example a film hinge, between the base part and the spring member.

The invention furthermore relates to a fixing system comprising a fastening assembly of the type explained here and a profiled element with flanges which bound a longitudinal slot between them, in particular a profiled element or rail of the C-section type.

The invention furthermore relates to a support adapted for a fastening assembly of the type described here.

The invention will be explained in greater detail below with reference to the drawings.

BRIEF DESCRIPTION OF THE DRAWINGS

FIGS. 2a-2d show in various views a first preferred embodiment of a washer element for a fastening assembly according to the invention;

FIGS. 3a-3d show in various views a preferred embodiment of a spring part for a fastening assembly according to the invention;

FIGS. 4a-4d show in various views a first preferred embodiment of a base part of a support for a fastening assembly according to the invention;

FIGS. 5a-5d show in various views that the spring part of FIG. 3 is fitted in the base part of FIG. 4;

FIGS. 7a-7d show in various views a second preferred embodiment of a washer element for a fastening assembly according to the invention;

FIGS. 8a-8d show in various views a preferred embodiment of a spring part for a fastening assembly according to the invention;

FIGS. 9a-9d show in various views a second preferred embodiment of a base part of a support for a fastening assembly according to the invention;

FIGS. 10a-10d show in various views that the spring part of FIG. 8 is fitted in the base part of FIG. 9;

DETAILED DESCRIPTION OF THE INVENTION

Figure 1:
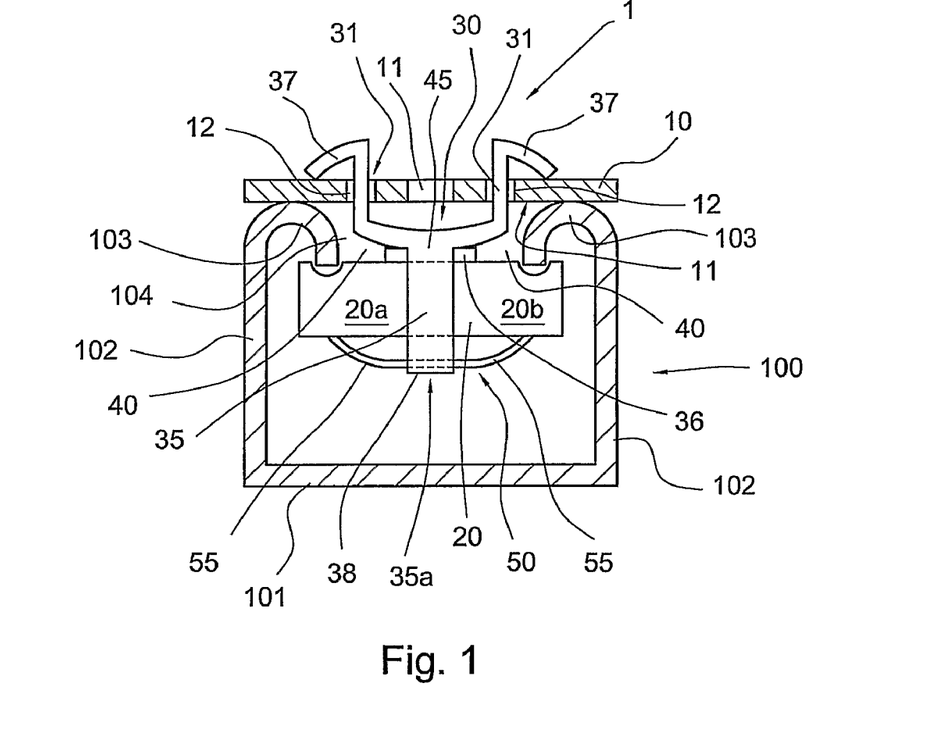
FIG. 1 shows a profiled element and an exemplary embodiment of a fastening assembly according to the invention.
Figure 2A:
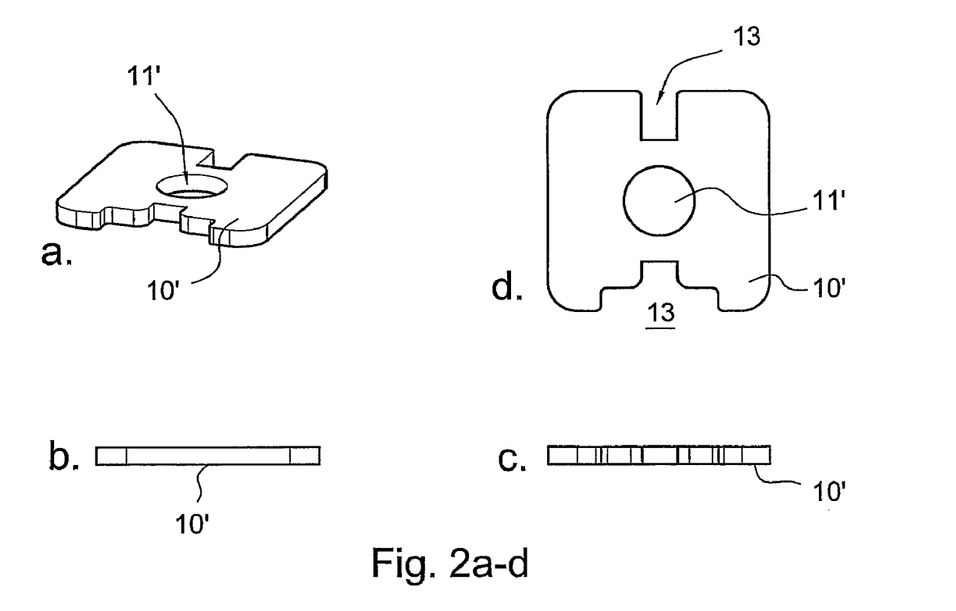
Figure 3A:
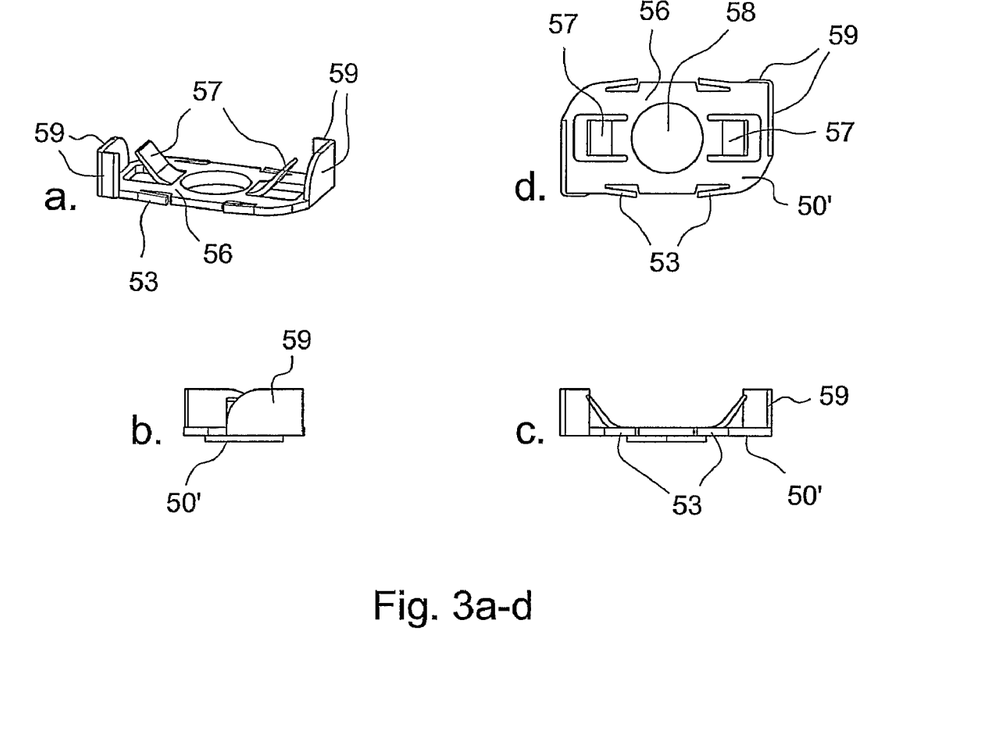
Figure 4A:
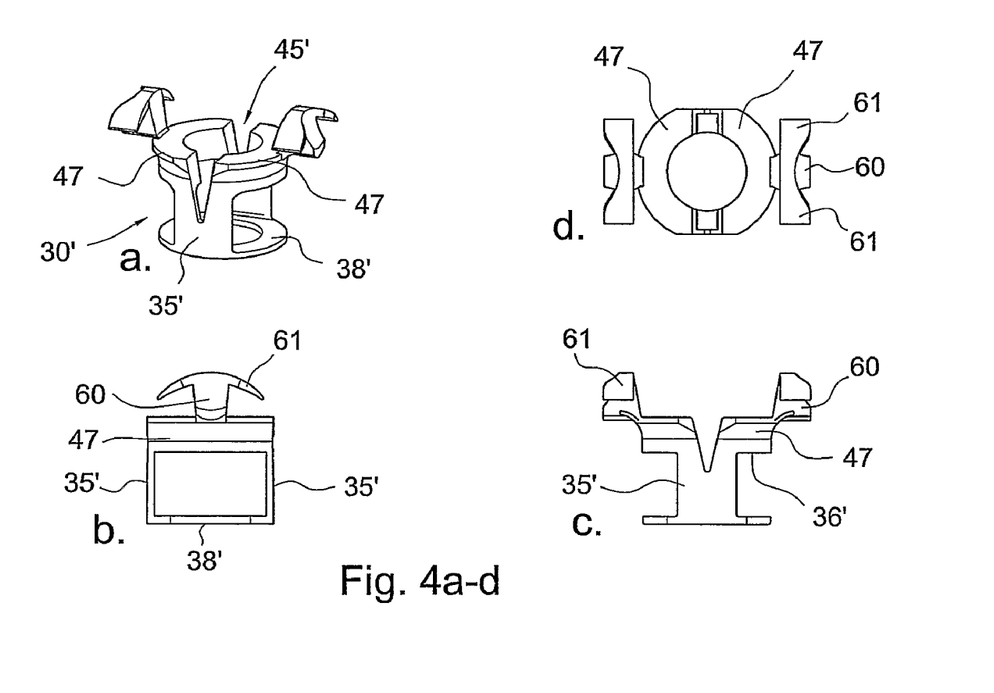
Figure 5A:
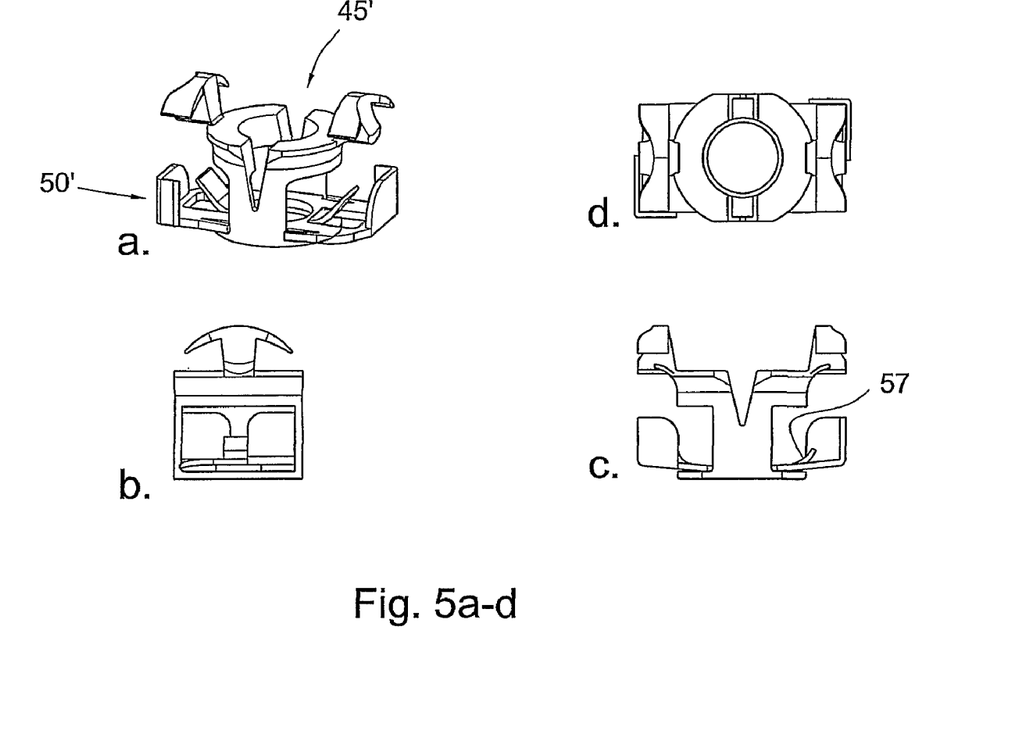

FIG. 1 shows a fastening assembly 1 which serves to fix an object to a profiled element 100.

The profiled element 100 is made of metal here. The profiled element 100 is of the C-section type and the element specifically illustrated is also known as a strut or rail element. The profiled element 100 here has a bottom 101, side walls 102, and on the upper side of the side walls 102 inward-facing flanges 103, which bound a longitudinal slot 104 between them.

It will be clear that the fastening assembly can also be fitted in other longitudinal slots or elongated holes, for example in elongated holes in the bottom 101 of such a profiled element (if present), or in other products provided with a suitable longitudinal slot or elongated hole which is bounded by opposite flanges.

In the installation trade such fastening assemblies are widely used for fitting pipe clips on profiled elements.

The fastening assembly 1 comprises:
a metal washer element 10, which has a bearing face 11 on the underside, which bearing face is arranged for resting against the outside of the flanges of the profiled element 100,
an elongated metal anchoring member 20, which is situated on the underside of the washer element 10, and which has axial end parts 20a, 20b,
a support 30 for the anchoring member 20, which support 30 is connected—possibly in a detachable manner—to the washer element 10, and which support bears the anchoring member 20.

The fastening assembly 1 has between the washer element 10 and each axial end part 20a, 20b of the anchoring member 20 an accommodation space 40 which is accessible from the side of the fastening assembly, each accommodation space being for the accommodation of a flange 103 of the profiled element 100.

The fastening assembly 1 can be fitted on the profiled element 100 according to a generally known method, in which the assembly with its anchoring member 20, in particular its longitudinal axis, is aligned with the longitudinal slot 104, and the anchoring member 20 is inserted through the longitudinal slot 104 into the profiled element 100.

The fitter then turns the assembly 1, preferably a quarter turn as shown here in FIG. 1, so that the anchoring member 20—in a pre-assembly state—extends at an angle, here at right angles, relative to the longitudinal slot 104. The flanges 103 are then situated in the accommodation spaces 40, and the anchoring member 20 grips with its axial end parts 20a,b behind the flanges 103 of the profiled element 100.

In a general sense, the support 30 comprises a head with one or more connecting members 31, which connecting members 31 engage, possibly detachably, with the washer element 10. The support 30 furthermore comprises legs 35, which extend from the head in a direction away from the washer element 10 to a bottom end 35a of the corresponding leg situated below the anchoring member 20.

The support 30 here furthermore comprises below the anchoring member 20 spring members 55, which rest upon the bottom ends 35a of the legs 35 and engage with the anchoring member 20 from underneath and resiliently support the anchoring member 20 from underneath.

The support 30 has a stop 36 above the anchoring member 20, the one or more spring members 55 holding the anchoring member 20 pressed against said stop 36 from underneath. For example, the stop 36 is formed by one or more transverse bodies between the legs 35.

The spring members 55 preferably have a spring travel of between 1 and 10 millimeters. In practice, a spring travel of the anchoring member of between 1 and 3 millimeters can be sufficient, in particular if the washer element 10 can move up and down relative to the anchoring member 20 pressed against the stop 36. That movement up and down can, for example, lie in the range between 1 and 3 millimeters.

In the embodiment shown according to FIG. 1 provision is made for the connecting members 31 to retain the washer element 10 movably relative to the anchoring member 20 pressed against the stop 36, in such a way that the washer element 10 can be tensioned in the direction towards the anchoring member 20 in order to fix the fastening assembly by clamping the flanges 103 between the anchoring member 20 and the washer element 10.

For example, a bolt element with a nut is fitted earlier on the fastening assembly 1, or this is performed after placing the assembly 1 in the pre-assembly state. Said boll element then projects through hole 11 in the washer element 10 and is then screwed into a threaded hole in the anchoring member 20. The support 30 will also have a passage here in the region between said hole 11 and the hole in the anchoring member 20. By tightening the nut, said nut goes against the upper side of the washer element 10, and the washer element 10 is thereby moved towards the anchoring member 20, and the flanges are clamped.

In the embodiment shown the head of the support 30 furthermore comprises clamping spring members 37, which here engage with the upper side of the washer element 10 and are fitted in order to provide a clamping effect between the assembly 1 and the profiled element 100 in the pre-assembly state (FIG. 1), which clamping effect is such that manual sliding of the assembly along the profiled element 100 is possible.

It will be clear that the clamping spring members (or the clamping spring member) can also be designed in a totally different way from that illustrated here, for example in such a way that the clamping spring member engages directly with the flanges 103 so as to clamp the anchoring member 20 against the flanges and obtain the envisaged clamping effect.

In the embodiment shown in FIG. 1 the support 30 has two legs 35, which extend along a longitudinal side of the anchoring member 20. A bottom 38 of the support 30 connects the bottom ends 35a of the legs 35 to each other.

The head of the support, here with connecting members 31 and clamping members 37, together with the legs 35, forms the stop 36, and the bottom 38 forms a base part 45. Said base part 45 is produced here in one piece, i.e. monolithically, from plastic by injection moulding.

The support 30 furthermore comprises a spring part 50 containing the one or more spring members 55. Said spring part 50 is placed here in the space between the leas 35, above the bottom 38 and below the anchoring member 20, the part 50 here being supported upon said bottom 38 and thereby on the ends 35a of the legs 35.

The spring part 50 here again is made by injection moulding from suitable plastic. An embodiment entirely or partly of spring steel is also conceivable.

The base part 45 and spring part 50 are therefore separate parts which are fixed to each other. For example, the spring par 50 is snapped into the base part 45. For example, the spring part 50 has on either side one or more snap elements for fixing the spring part relative to a leg 35 of the support 30.

In the embodiment shown in FIG. 1 the spring part 50 is in the form of a leaf spring with upwardly directed ends which lie underneath and against the anchoring member. In a variant the spring part has as spring members one or more resilient lips which engage with the anchoring member from underneath.

In practice, the demand for such assemblies 1 is for situations in which the bolt element (which is fitted as a separate part on the assembly, at the time of assembly or during the subsequent fitting, or which is integral with the anchoring member) has to have different diameters. Various thicknesses of the anchoring member 20 are then required corresponding to those different diameters. For instance, for assemblies suitable for bolt diameters of M8, M10 and M12 it is known to use respective thicknesses of the metal anchoring member of 6 mm, 8 mm and 9 mm, but other thicknesses are also found in practice.

In the case of the assembly 1 assemblies with such anchoring members 20 of different thicknesses can be made on the basis of one standardised embodiment of the support 30. In said arrangement the anchoring members 20 with different thickness are designed here in such a way that they all fit into the space between the legs, the bottom member and the stop of the support. The resiliency of the one or more spring members 55 then absorbs the differences in thickness of the anchoring members 20.

A preferred embodiment of the fastening assembly will now be explained with reference to FIGS. 2-6. Parts corresponding here to parts according to the assembly 1 of FIG. 1 are given the same reference numerals with an apostrophe.

FIGS. 2a-d show in various views the washer element 10', which in this case is in the form of a substantially rectangular metal plate with a central hole 11'. An opening 13 for a connecting member of the support is provided in each case in the outer periphery of the washer element 10', on opposite sides.

FIGS. 3a-d show in various views the spring part 50', which in this case has plate element 56, which extends below the anchoring member 20. From the face of the plate element 56 here two resilient lips 57 project upwards at an angle, which lips engage with the anchoring member 20 from underneath. It can be seen that the spring part 50' has a central hole 58, in line with the threaded hole in the anchoring member 20.

The spring part 50' furthermore has upright walls 59, here near diagonally opposite corners of the spring part 50', which grip round a corner of the anchoring member 20.

It can also be seen that the spring part 50' has on either side snap elements 53 for fixing the spring part 50' relative to a leg 35' of the support 30'.

FIGS. 4a-d show the base part 45' of the support 30', which in this case is made in one piece of plastic.

The base part 45' has two leas 35', which are connected by a bottom member 38' at their bottom ends. The legs 35' each have on their upper side a fork part, so that the legs 35' each have two top ends. The head of the base part 45' here comprises two bridge parts 47, in this case semi-circular bridge parts (in top view), which in each case connect a top end of a leg 35' to the top end of a leg situated on the other side of the anchoring member 20. Said bridge parts 47 thus extend over the upper side of the anchoring member 20 and in so doing form a stop 36' for the anchoring member 20.

At diametrically opposite points an upstanding trunk 60 is formed on each bridge part 47, having resilient arms 61 projecting laterally from the trunk 60.

FIGS. 5a-d show that the spring part 50' is fitted in the base part 45'. It is pointed out here that it is preferable in practice for the anchoring member 20 to be placed on the spring part 50' first, and for the whole combination then to be fitted in the base part 45'.

Figure 6:
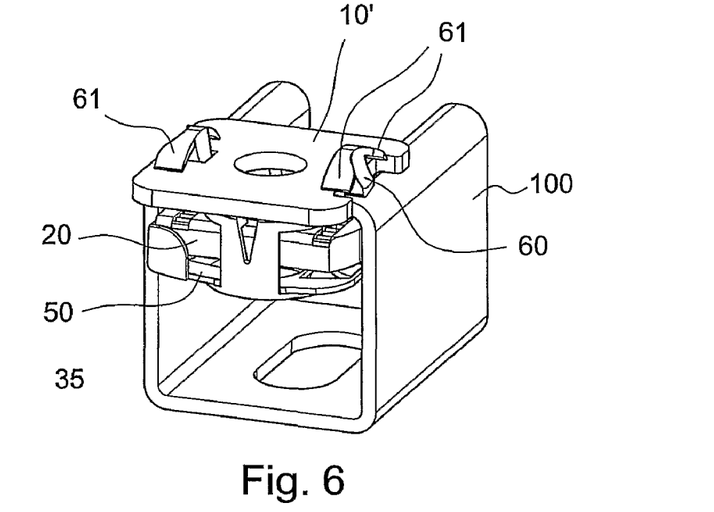
FIG. 6 shows a profiled element and a first preferred embodiment of a fastening assembly according to the invention.
Figure 7A:
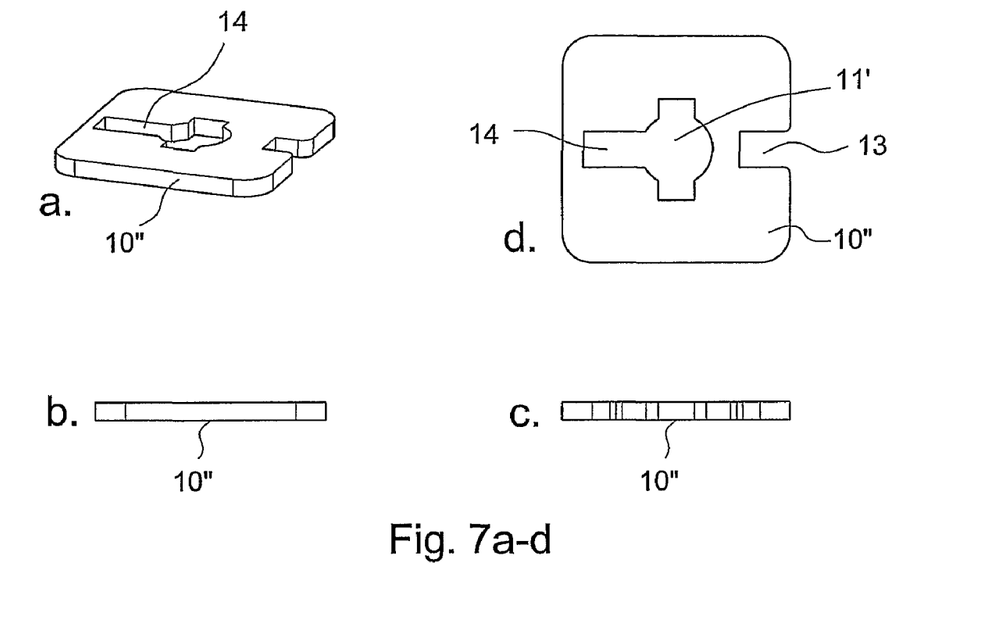
Figure 8A:
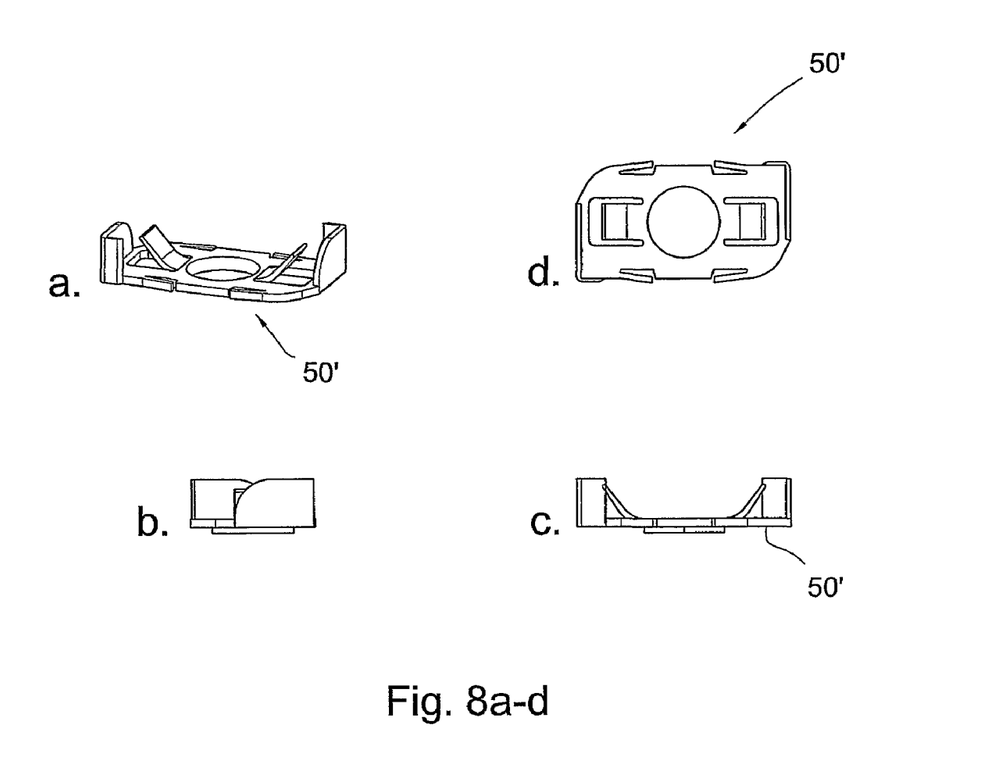
Figure 9A:
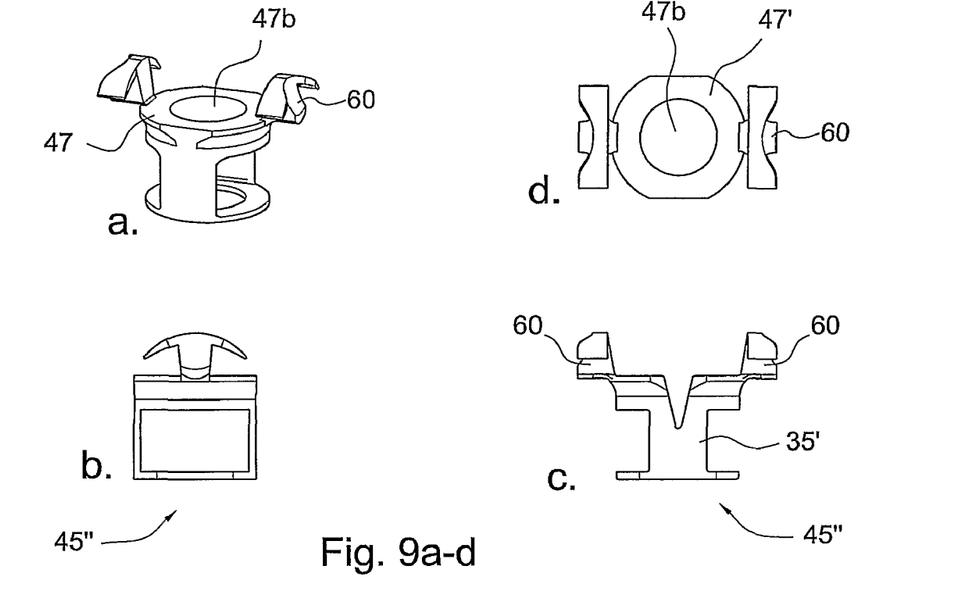
Figure 10A:
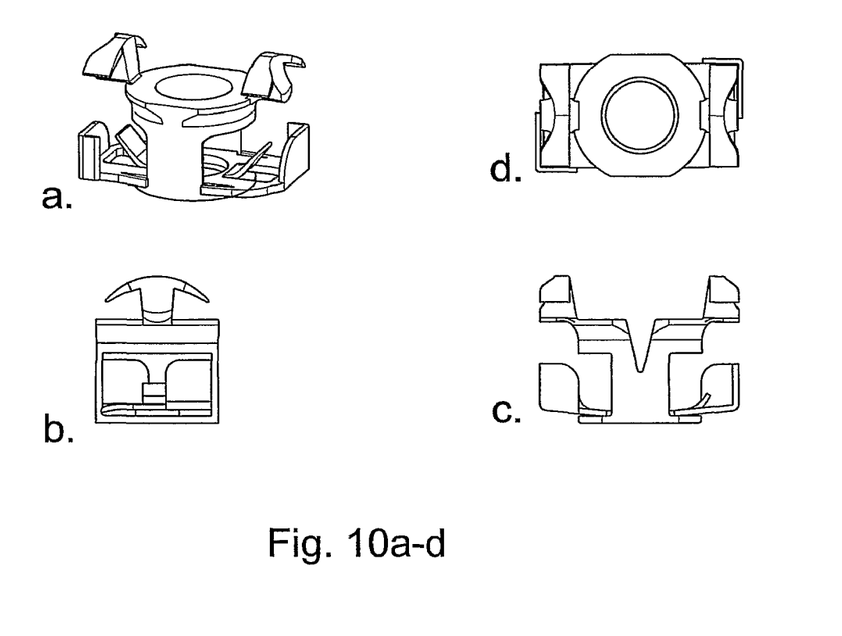

FIG. 6 shows that the assembly including the anchoring member 20 accommodated in it is placed in a profiled element 100. It can be seen that the trunk 60 in each case extends through an opening 13 and the resilient arms 61 engage with the upper side of the washer element 10.

FIGS. 7-11 show a variant of the embodiment according to FIGS. 2-6. Only differences will be explained below.

Only one opening 13 is provided in the washer element 10", on the outer periphery. Furthermore, provision is made for a slot aperture 14 to extend therein from the central aperture 11", in such a way that corresponding connecting members of the support, here the trunks 60, situated at a distance from each other, can be slid from the central aperture 11' into the slot aperture 14 and into the opening 13 on the outer periphery, respectively.

FIGS. 8a-d show the same spring part 50' as FIGS. 3a-d.

FIGS. 9a-d show the base part 45" of the support, the head having a closed annular element 47' extending around a central passage 47b.

FIGS. 10a-d show the joining together of spring part 50' and base part 45".

Figure 11:
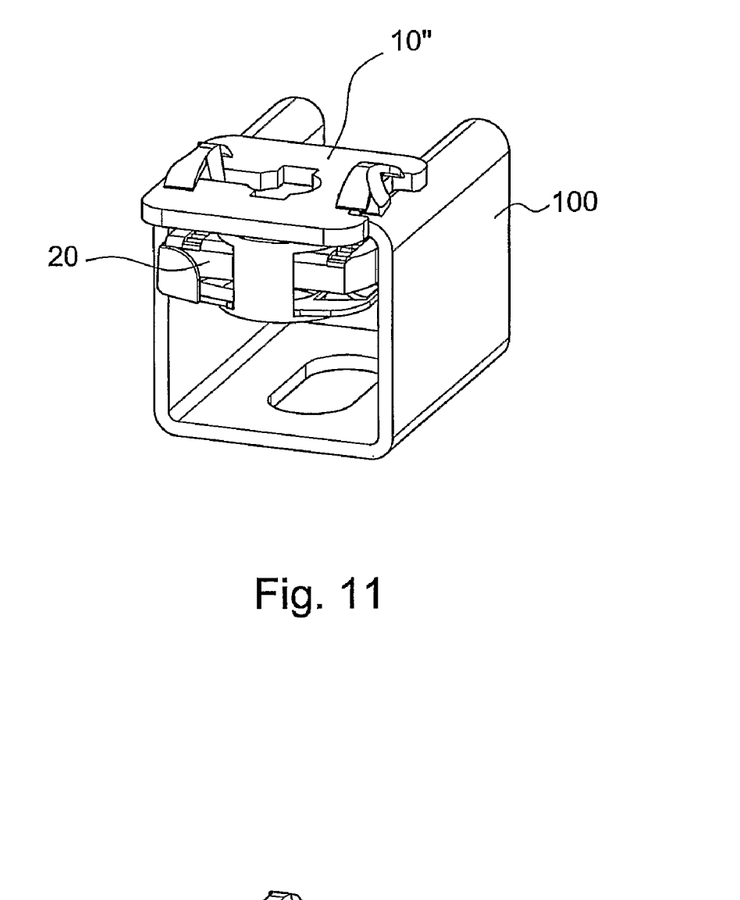
FIG. 11 shows a profiled element and a second preferred embodiment of a fastening assembly according to the invention.

FIG. 11 shows the complete assembly according to FIGS. 7-10, placed in profiled element 100.

Figure 12:
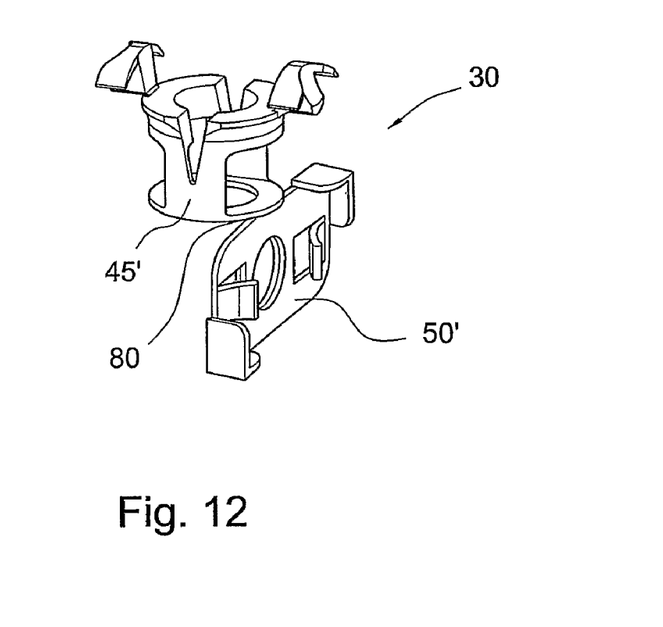
FIG. 12 shows the spring part of FIG. 3 and the base part of FIG. 4 which come out of an injection mould connected to each other.

FIG. 12 shows the idea for producing the base part 45' and the spring part 50' in a single injection mould, in which these parts are connected to each other by one or more removable connections, for example a film hinge 80.

What is claimed is:

1. A fastening assembly for fixing an object to a profiled element with flanges which bound a longitudinal slot between them, in particular a profiled element of the C-section type, which fastening assembly comprises:
    a metal washer element, which has a bearing face that is arranged for resting against the outside of the profiled element,
    an elongated metal anchoring member, which is situated on the underside of the bearing face of the washer element and has axial end parts, and
    a support for the anchoring member, which support is connected to the washer element, possibly detachably, and which support bears the anchoring member,
    the fastening assembly having between the washer element and each axial end part of the anchoring member an accommodation space which is accessible from the side of the fastening assembly, each accommodation space being for the accommodation of a flange of the profiled element, in such a way that the fastening assembly with its anchoring member can be aligned with the longitudinal slot and the anchoring member can be inserted through the longitudinal slot into the profiled element, and in such a way that subsequently after turning of the fastening assembly, the anchoring member—in a pre-assembly state—extends at an angle relative to the longitudinal slot, so that the flanges are situated in the accommodation spaces and the anchoring member grips behind the flanges of the profiled element,
    wherein the anchoring member and the washer element can subsequently be tensioned towards each other in order to fix the fastening assembly to the profiled element,
    wherein the support comprises a head with one or more connecting members, which connecting members, engage with the washer element, and furthermore comprises legs, each extending from the head in a direction away from the washer element to a bottom end of the corresponding leg situated below the anchoring member,
    wherein the support below the anchoring member comprises one or more spring members, which are supported upon the bottom ends of the legs and engage onto the anchoring member from underneath and resiliently support the anchoring member from underneath, and
    wherein each connecting member has an upstanding trunk and resilient arms projecting laterally from the trunk, the trunk extending through an aperture in or along the outer periphery of the washer element and the resilient arms engaging with the upper side of the washer element.

2. The assembly according to claim 1, wherein the support has a stop above the anchoring member, the one or more spring members holding the anchoring member pressed against said stop from underneath.

3. The assembly according to claim 1, wherein the spring members provide a spring travel for the anchoring member of between 1 and 10 millimeters.

4. The assembly according to claim 2, wherein the one or more connecting members retain the washer element movably relative to the anchoring member pressed against the stop, in such a way that the washer element can be tensioned in the direction towards the anchoring member in order to fix the fastening assembly by clamping of the flanges.

5. The assembly according to claim 4, wherein the head of the support furthermore comprises at least one clamping spring member, which is designed to provide a clamping effect between the assembly and the profiled element in the pre-assembly state, which clamping effect is such that it is possible to slide the assembly manually along the profiled element.

6. The assembly according to claim 1, wherein the one or more connecting members of the support retain the washer element so as to be movable up and down relative to the anchoring member pressed against the stop, and wherein the head of the support furthermore comprises at least one clamping spring member which engages with the washer element in such a way that in the pre-assembly state the flanges of the profiled element are each clamped between an axial end part of the anchoring member and the washer element, in such a way that it is possible to slide the assembly manually along the profiled element.

7. The assembly according to claim 1, wherein the support has legs each extending along a longitudinal side of the anchoring member.

8. The assembly according to claim 1, wherein the support has a bottom member which connects the bottom ends of the legs to each other.

9. The assembly according to claim 1, wherein the support comprises a base part and furthermore a spring part, which base part contains at least the head of the support, and which spring part contains at least the one or more spring members, which base part and spring part are separate parts which are fixed to each other.

10. The assembly according to claim 8, wherein the support comprises a base part and furthermore a spring part, which base part contains at least the head of the support, and which spring part contains at least the one or more spring members, which base part and spring part are separate parts which are fixed to each other, wherein the base part comprises the head and also the legs and the bottom member, and wherein the spring part is disposed in the space between the legs, the anchoring member and the bottom member.

11. The assembly according to claim 9, wherein the spring part is snapped onto the base part.

12. The assembly according to claim 11, wherein the spring part on either side comprises one or more snap elements for fixing the spring part relative to a leg of the support.

13. The assembly according to claim 1, wherein the spring part comprises as spring members one or more resilient lips, which engage with the anchoring member from underneath.

14. The assembly according to claim 1, wherein the anchoring member has a central bore.

15. The assembly according to claim 1, wherein the support, in particular a support provided with a bottom member between the ends of the legs, has a central passage.

16. The assembly according to claim 1, wherein the head of the support comprises an annular element, which extends around a central passage.

17. The assembly according to claim 1, wherein the washer element has a central aperture.

18. The assembly according to claim 1, wherein at points situated at a distance from each other, for example at points along two opposite sides of the washer element, the washer element in each case has an opening for a connecting member of the support.

19. The assembly according to claim 17, wherein at points situated at a distance from each other, for example at points along two opposite sides of the washer element, the washer element in each case has an opening for a connecting member of the support, wherein a slot aperture extends in the washer element from the central aperture therein, and wherein in the outer periphery of the washer element an opening is provided, in such a way that corresponding connecting members of the support situated at a distance from each other can be slid out of the central aperture into the slot aperture and into the opening on the outer periphery respectively.

20. The assembly according to claim 9, wherein the spring part has a plate element, which extends below the anchoring member, wherein the one or more spring members project upwards from the plate element and engage with the anchoring member.

21. The assembly according to claim 20, wherein the spring part has one or more upstanding parts, inside which the anchoring member lies.

22. The assembly according to claim 9, wherein the base part and the spring part are produced in a single injection mould and are connected to each other by one or more frangible connections.

23. The assembly according to claim 1, wherein the support is made of plastic.

24. The assembly according to claim 1, wherein the support has two legs, which each have on their upper side a fork part, so that the legs each have two top ends, the head having two bridge parts, which in each case connect a top end of a leg to the top end of a leg situated on the other side of the anchoring member.

25. A method for producing various embodiments of fastening assemblies according to claim 1, in which a single uniform support is produced in each case for several embodiments of fastening assemblies, and in which anchoring members are produced in different embodiments, in which at least the thickness of the anchoring member, viewed in the direction at right angles to the washer element, is different, and in which the anchoring members in different embodiments are further so similar that they can each be placed in the uniform support,
in which an anchoring member is placed in a support, and in which the one or more spring members of the support provide at least one elastic receptacle for the various thicknesses of the anchoring members.

26. A method for manufacturing a fastening assembly according to claim 1, in which the support comprises a base part, which contains at least the head of the support, and furthermore a spring part, which spring part contains at least the one or more spring members, which base part and spring part are produced as separate parts and fixed to each other.

27. The method according to claim 26, in which the base part and the spring part are made of plastic, preferably simultaneously in a common injection mould, preferably with the formation of one or more frangible connections, for example a film hinge, between the base part and the spring member.

28. A fixing system comprising a profiled element with flanges which bound a longitudinal slot between them, in particular a profiled element of the C-section type and a fastening assembly for fixing an object to said profiled element, which fastening assembly comprises:
a metal washer element, which has a bearing face that is arranged for resting against the outside of the profiled element,
an elongated metal anchoring member, which is situated on the underside of the bearing face of the washer element and has axial end parts, and
a support for the anchoring member, which support is connected to the washer element, possibly detachably, and which support bears the anchoring member,
the fastening assembly having between the washer element and each axial end part of the anchoring member an accommodation space which is accessible from the side of the fastening assembly, each accommodation space being for the accommodation of a flange of the profiled element, in such a way that the fastening assembly with its anchoring member can be aligned with the longitudinal slot and the anchoring member can be inserted through the longitudinal slot into the profiled element, and in such a way that subsequently after turning of the fastening assembly, the anchoring member—in a pre-assembly state—extends at an angle relative to the longitudinal slot, so that the flanges are situated in the accommodation spaces and the anchoring member grips behind the flanges of the profiled element,
wherein the anchoring member and the washer element can subsequently be tensioned towards each other in order to fix the fastening assembly to the profiled element,
wherein the support comprises a head with one or more connecting members, which connecting members, engage with the washer element, and furthermore comprises legs, each extending from the head in a direction away from the washer element to a bottom end of the corresponding leg situated below the anchoring member, and
wherein the support below the anchoring member comprises one or more spring members, which are supported upon the bottom ends of the legs and engage onto the anchoring member from underneath and resiliently support the anchoring member from underneath.

29. A support intended for a fastening assembly according to claim 1.

* * * * *